United States Patent
Peake

(10) Patent No.: US 11,577,101 B2
(45) Date of Patent: Feb. 14, 2023

(54) COMPOSITION CONTROL FOR OBOGS

(71) Applicant: Cobham Mission Systems Davenport LSS Inc., Davenport, IA (US)

(72) Inventor: Steven C. Peake, Dubuque, IA (US)

(73) Assignee: Mission Systems Davenport Inc., Davenport, IA (US)

( * ) Notice: Subject to any disclaimer, the term of this patent is extended or adjusted under 35 U.S.C. 154(b) by 327 days.

(21) Appl. No.: 17/031,269

(22) Filed: Sep. 24, 2020

(65) Prior Publication Data

US 2021/0086003 A1  Mar. 25, 2021

Related U.S. Application Data

(60) Provisional application No. 62/905,078, filed on Sep. 24, 2019.

(51) Int. Cl.
*A62B 7/14* (2006.01)
*A62B 9/00* (2006.01)
(Continued)

(52) U.S. Cl.
CPC ............ *A62B 7/14* (2013.01); *A62B 9/006* (2013.01); *B01D 53/30* (2013.01);
(Continued)

(58) Field of Classification Search
CPC .......... B01D 2256/12; B01D 2257/102; B01D 2259/40009; B01D 2259/4575;
(Continued)

(56) References Cited

U.S. PATENT DOCUMENTS 3,556,098 A * 1/1971 Kanwisher .......... A61M 16/024
128/205.12
4,928,682 A   5/1990 Stevenson et al.
(Continued)

FOREIGN PATENT DOCUMENTS

EP          0262934 A2 *  9/1987  ............. B01D 53/04
WO       2006-033896       3/2006
WO    WO-2013134645 A1 *  9/2013  .......... A61M 16/101

*Primary Examiner* — Tu A Vo
(74) *Attorney, Agent, or Firm* — Woods Oviatt Gilman LLP; Katherine H. McGuire, Esq.

(57) ABSTRACT

A control system for an onboard oxygen generating system (OBOGS) includes a gain control communicatively coupled to an oxygen sensor configured to measure an oxygen concentration outputted from the OBOGS. The gain control selectively switches between unbalanced and balanced bed cycling modes of the OBOGS to produce a target oxygen concentration based on demand. A corresponding method includes providing a gain control communicatively coupled to an oxygen sensor configured to measure an oxygen concentration outputted from the OBOGS, controlling the OBOGS to operate in the unbalanced bed cycling mode when a low demand is placed on the OBOGS whereby the gain control provides a short bed cycle and a corresponding long cycle of a fixed cycle time, and switching the OBOGS to operate in the balanced bed cycling mode when a high demand is placed on the OBOGS. The balanced bed cycling mode operates at a decreased bed cycle time.

7 Claims, 1 Drawing Sheet

(51) Int. Cl.
  *C01B 13/02*   (2006.01)
  *B01D 53/30*   (2006.01)

(52) U.S. Cl.
  CPC ...... *C01B 13/0259* (2013.01); *B01D 2256/12* (2013.01); *B01D 2257/102* (2013.01); *B01D 2259/40009* (2013.01); *B01D 2259/4575* (2013.01)

(58) Field of Classification Search
  CPC ........... B01D 53/30; A62B 9/006; A62B 7/14; C01B 13/0259
  See application file for complete search history.

(56) References Cited

U.S. PATENT DOCUMENTS

| | | | |
|---|---|---|---|
| 5,004,485 A * | 4/1991 | Hamlin | B01D 53/0454 96/111 |
| 5,858,063 A * | 1/1999 | Cao | B64D 10/00 96/111 |
| 6,216,690 B1 * | 4/2001 | Keitel | A61M 16/026 128/204.21 |
| 6,383,256 B1 * | 5/2002 | Phillips | C01B 13/0259 96/111 |
| 8,070,864 B2 * | 12/2011 | Uchiyama | C01B 13/0259 128/205.24 |
| 9,550,570 B2 | 1/2017 | Kshirsagar et al. | |
| 2004/0134349 A1 * | 7/2004 | Murley | B01D 53/0454 95/96 |
| 2007/0214954 A1 * | 9/2007 | Hedges | B64D 13/00 95/8 |
| 2008/0047435 A1 * | 2/2008 | Dolensky | B01D 53/047 96/121 |
| 2013/0333564 A1 * | 12/2013 | Shelnutt | F04B 45/047 96/115 |
| 2014/0331857 A1 | 11/2014 | Massey et al. | |
| 2018/0289992 A1 * | 10/2018 | Peake | B01D 53/047 |

* cited by examiner

COMPOSITION CONTROL FOR OBOGS

BACKGROUND OF THE INVENTION

The present invention relates to an onboard oxygen generating system (OBOGS) of an aircraft, and more particularly to a system and method to improve the volume of oxygen that can be separated via pressure swing adsorption (PSA) separation processes under conditions of very high product oxygen demand and as the efficiency of sieve material in the beds degrades over time.

Operation of a PSA system which operates at a controlled oxygen concentration has been in use for many years. One such system is described in U.S. Pat. No. 6,383,256 (the '256 patent). The method disclosed within the '256 patent uses a fixed time cycle of the PSA process where the oxygen concentration in the product gas is controlled via adjustment of the time one bed is separating oxygen versus the time another bed is separating oxygen. By making the duration of separation time of the two beds different, the system effectively allows more nitrogen into the product gas, thereby reducing the oxygen concentration, preferably to the partial pressure of oxygen required as a function of aircraft altitude.

While generally acceptable, one shortcoming of the method disclosed within the '256 patent is that when the beds reach an equal time base, the method can no longer optimize the amount of oxygen that can be concentrated. Thus, when there is very high demand or a degradation in the efficiency of the sieve material over time, the system can lose the capability to deliver sufficient oxygen.

It is known that a shorter bed cycle time can provide a higher oxygen production rate. One may assume that the answer to the above shortcoming in performance would be to make the baseline PSA cycle time shorter. However, operating at short cycle times has several drawbacks. First, as the cycle time becomes shorter, the systems use proportionally more air to pressurize and depressurize the beds. For aircraft operation, where the OBOGS is supplied with engine bleed air, this comes at a penalty to the aircraft bleed air system. Additionally, this introduces greater average pressure drop in the system, potentially causing lower than desired pressure supply to the breathing regulators and the pilots. In systems supplied by other pressurized air, the additional flow required comes at a cost of higher power as well as higher average pressure drop.

Thus, there is a need for a method that increases the amount of oxygen that can be generated during high demand events and/or when the sieve in the system has become less efficient over time, while reducing power consumption, bleed air consumption, and pressure drop during periods of lower demand.

SUMMARY OF THE INVENTION

The present invention addresses the above needs by providing a control system for an onboard oxygen generating system (OBOGS) which includes a gain control communicatively coupled to an oxygen sensor configured to measure an oxygen concentration outputted from the OBOGS. The gain control selectively switches between unbalanced and balanced bed cycling modes of the OBOGS to produce a target oxygen concentration based on demand.

In accordance with a further aspect of the present invention, a method for transitioning between unbalanced and balanced bed cycling modes of an onboard oxygen generating system (OBOGS) as a function of demand includes providing a gain control communicatively coupled to an oxygen sensor configured to measure an oxygen concentration outputted from the OBOGS, controlling the OBOGS to operate in the unbalanced bed cycling mode when a low demand is placed on the OBOGS whereby the gain control provides a short bed cycle and a corresponding long cycle of a fixed cycle time, and switching the OBOGS to operate in the balanced bed cycling mode when a high demand is placed on the OBOGS. The balanced bed cycling mode operates at an equivalent or decreased bed cycle time relative to the unbalanced bed cycling mode, depending on demand

DETAILED DESCRIPTION

Figure 1:
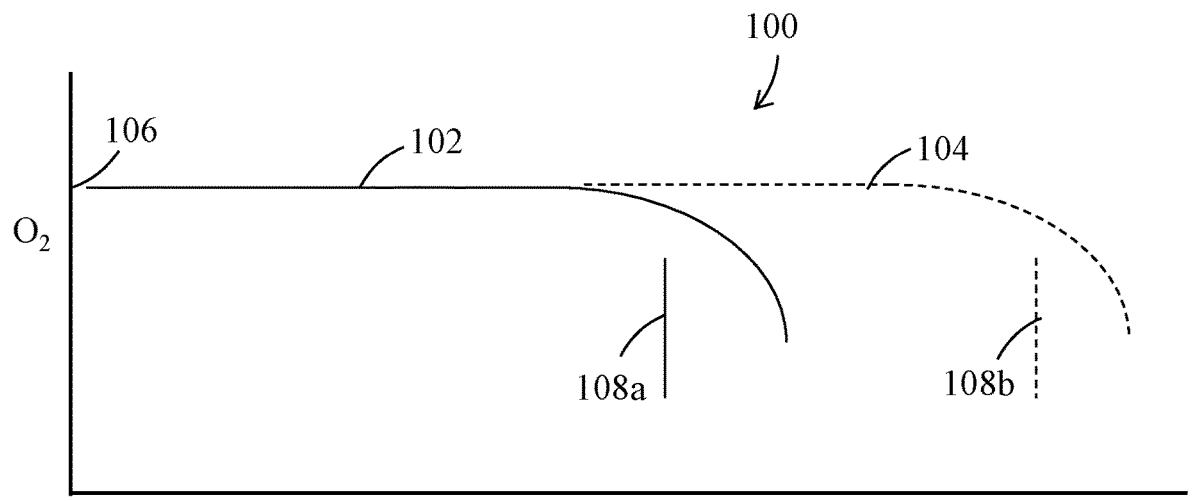
FIG. 1 is a representative plot of oxygen production obtained using an embodiment of a method in accordance with the present invention.

Turning now to the figures, with particular reference to FIG. 1, a flow diagram 100 illustrating a method of controlling oxygen production using an OBOGS is shown. As generally shown, in accordance with the present invention, a longer bed cycle may be used with unbalanced bed cycles during normal operation 102, and with an increased production of oxygen when the control system has reached its maximum output by using a balanced cycle time between beds with shorter cycle times 104, as will be described in greater detail below.

By way of example, flow diagram 100 may be used in newer OBOG systems, such as those designed to meet an oxygen delivery schedule. The control output for these systems adjusts the bed cycle time in order to control the amount of oxygen that is concentrated to a prescribed level 106 at certain altitudes.

The use of balanced bed cycles 104 to control the amount of oxygen concentrated works well at high demands, but as demand is decreased, the bed cycle times become significantly longer. This reduces the ability to control the concentration of oxygen delivered when dynamic changes are present, making it a less desirable method for control under typically low demands.

The use of unbalanced bed cycles 102 to control the oxygen concentration is very effective at lower demands to control oxygen concentration, but the cycle times must be quite short in order to produce enough oxygen to support high demand conditions. However, as described above, using short bed cycle times requires significantly more supply air which increases power usage, increases average pressure drop through the entire system and increases the rate of degradation of components, including the sieve material used to separate the oxygen in the system.

Thus, as shown in FIG. 1, an embodiment of the present invention uses both of these two distinct types of bed cycle control to produce the oxygen concentration output, depending on the demand, thereby optimizing the operation in both low demand 102 and higher demand 104 conditions. Should unbalanced cycles be used exclusively, caution lights will issue an alert 108a to the pilot at a lower demand flow as opposed to caution light alert 108b when utilizing oxygen control method 100. Additionally, the control transition between the two different modes (unbalanced/balanced bed cycles) can also cause system instabilities. However, as seen in FIG. 1, a seamless transition between the low demand unbalanced bed cycle operation 102 and the balanced bed cycle operation 104 may be achieved in accordance with the present invention.

Figure 2:
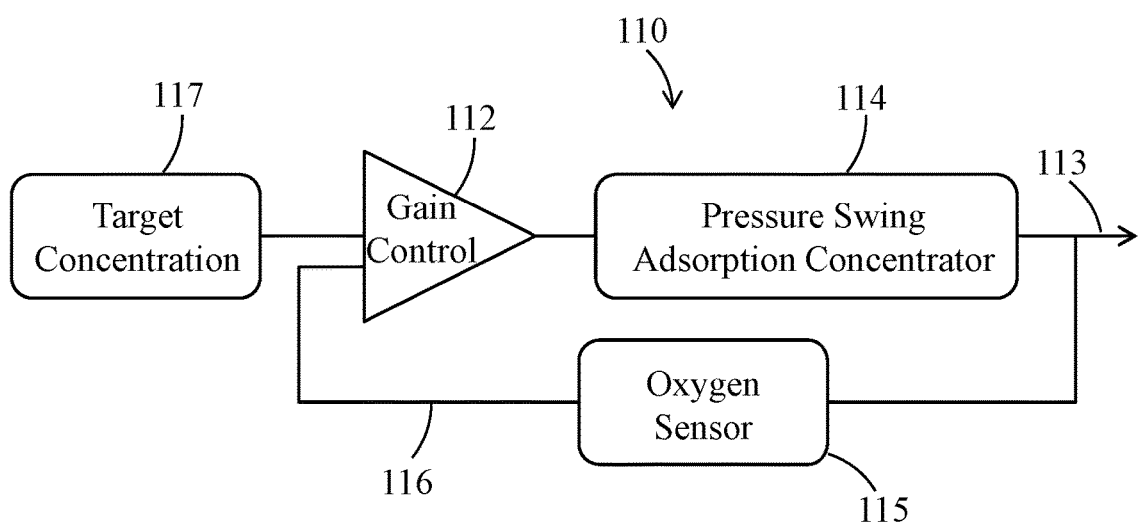
FIG. 2 is a system for controlling oxygen production of an onboard oxygen generating system using an embodiment of a method in accordance with the present invention.

Specifically, as shown generally in FIG. 2, an output control system 110 in accordance with an aspect of the present invention uses a continuous output from a system feedback gain control 112 to provide a seamless output 113 from the PSA concentrator 114 as the demand for oxygen produced increases. System 110 normally operates in an unbalanced bed cycle mode (FIG. 1, 102) where the timing between the bed under pressure and delivering oxygen and the bed(s) being vented is not equal. This imbalance between the timing of the two bed functions reduces the efficiency of the PSA process and thus produces gas outlet that can be controlled at values less than the maximum output.

By using a control signal 116, which compares measured output 113 via oxygen sensor 115 to target concentration 117, to adjust the offset in the beds, the output concentration can be controlled. As the time difference between the two beds increases, the efficiency drops, as well as the concentration of oxygen. Conversely, as the bed times become closer to one another, their efficiency increases and the oxygen concentration increases.

As an example, the demand on PSA concentrator 114 may be very low, and with a two bed system, the time difference between the beds may be large with the long bed being 4 seconds and the short bed being 2 seconds (for a fixed 6 second cycle time). The gain of the control provides an output that is equivalent to the short bed cycle. In this case, the control calls for an output of 2 seconds. As the demand increases for product gas, the control calls for greater output, increasing from 2 to 2.5 seconds and eventually on to 3 seconds. The time difference between beds becomes more equal until the control will cause the time of both beds to be 3 seconds and 3 seconds when the control calls for 3 seconds. If the demand continues to rise, the control will require an output of 3.1 seconds and higher. However, the beds cannot respond as they are concentrating the maximum amount of oxygen with the fixed 6 second cycle time. As a result, this is the extent of the unbalanced bed control.

In accordance with an aspect of the present invention, additional output may be seamlessly provided as the demand continues to increase. By using gain control 112, when the demand increases such that the control calls for 3.1 seconds for example, instead of changing the imbalance of the cycle time, the control decreases the time of each bed equally. In the above case, when gain control calls for 3.1 second output, the amount above 3.0 seconds is converted to a balanced value of 2.9 seconds for each bed (for a total balanced cycle time of 5.8 seconds). Since control 112 does not have to account for this transition, control 112 continues to function without change. The bed timing based on the output of the control computation changes to make a slightly shorter overall cycle with balanced beds (e.g., 5.8 second as opposed to the fixed 6 second cycle time). See FIG. 1, 104. As a result, the PSA concentrator 114 will concentrate slightly more oxygen. If the demand drops back down and the control output commands 2.9 seconds, the beds may then be controlled to a slightly unbalanced cycle 102, thereby reducing the amount of oxygen produced.

Thus, a method in accordance with the present invention may be used to increase the maximum output of the concentrator in times of high demand without the penalties of a more rapid bed cycle when the demand is low. As a result, the OBOGS may be more responsive to dynamic changes and may be able to autocorrect for degradation of the efficiency of the PSA sieve material over time.

Although the invention has been described with reference to preferred embodiments thereof, it is understood that various modifications may be made thereto without departing from the full spirit and scope of the invention as defined by the claims which follow.

What is claimed is:

1. A control system for an onboard oxygen generating system (OBOGS) comprising:
   a gain control communicatively coupled to an oxygen sensor configured to measure an oxygen concentration outputted from the OBOGS, whereby the gain control selectively switches between unbalanced and balanced bed cycling modes of the OBOGS to produce a target oxygen concentration;
   wherein the OBOGS operates in the unbalanced bed cycling mode for a fixed bed cycle time wherein the gain control communicates a length of an output cycle that is less than one-half of the fixed bed cycle time; and
   wherein, when the gain control communicates the length of the output cycle to be greater than one-half the fixed bed cycling time, the gain control switches to the balance bed cycling mode, and wherein the balanced bed cycle time is less than the fixed bed cycle time.

2. The control system of claim 1 wherein cycle times of the unbalanced bed cycling mode are commanded to become more balanced when the oxygen sensor indicates a lower oxygen concentration than the target oxygen concentration.

3. The control system of claim 2 wherein the unbalanced bed cycling mode shifts to the balanced bed cycling mode when the cycle times of the unbalanced bed cycling mode become equivalent.

4. The control system of claim 1 wherein cycle times when operating in the balanced bed cycling mode decrease when the oxygen sensor indicates a lower measured oxygen concentration outputted from the OBOGS than the target oxygen concentration.

5. The control system of claim 1 wherein the target oxygen concentration is determined based on aircraft altitude.

6. The control system of claim 1 wherein a caution light is activated when the oxygen concentration outputted from the OBOGS is less than the target oxygen concentration.

7. A method for transitioning between unbalanced and balanced bed cycling modes of an onboard oxygen generating system (OBOGS) as a function of demand, the method comprising:
   a) providing a gain control communicatively coupled to an oxygen sensor
   configured to measure an oxygen concentration outputted from the OBOGS;
   b) controlling the OBOGS to operate in the unbalanced bed cycling mode when a low demand is placed on the OBOGS whereby the gain control causes the OBOGS operate using a fixed cycle time comprising a short bed cycle portion and a long bed cycle portion;
   c) switching the OBOGS to operate in the balanced bed cycling mode having a balanced bed cycle time comprising two equal bed cycle portions when a high demand is placed on the OBOGS, and wherein the balanced bed cycle time is less than the fixed cycle.

* * * * *